…

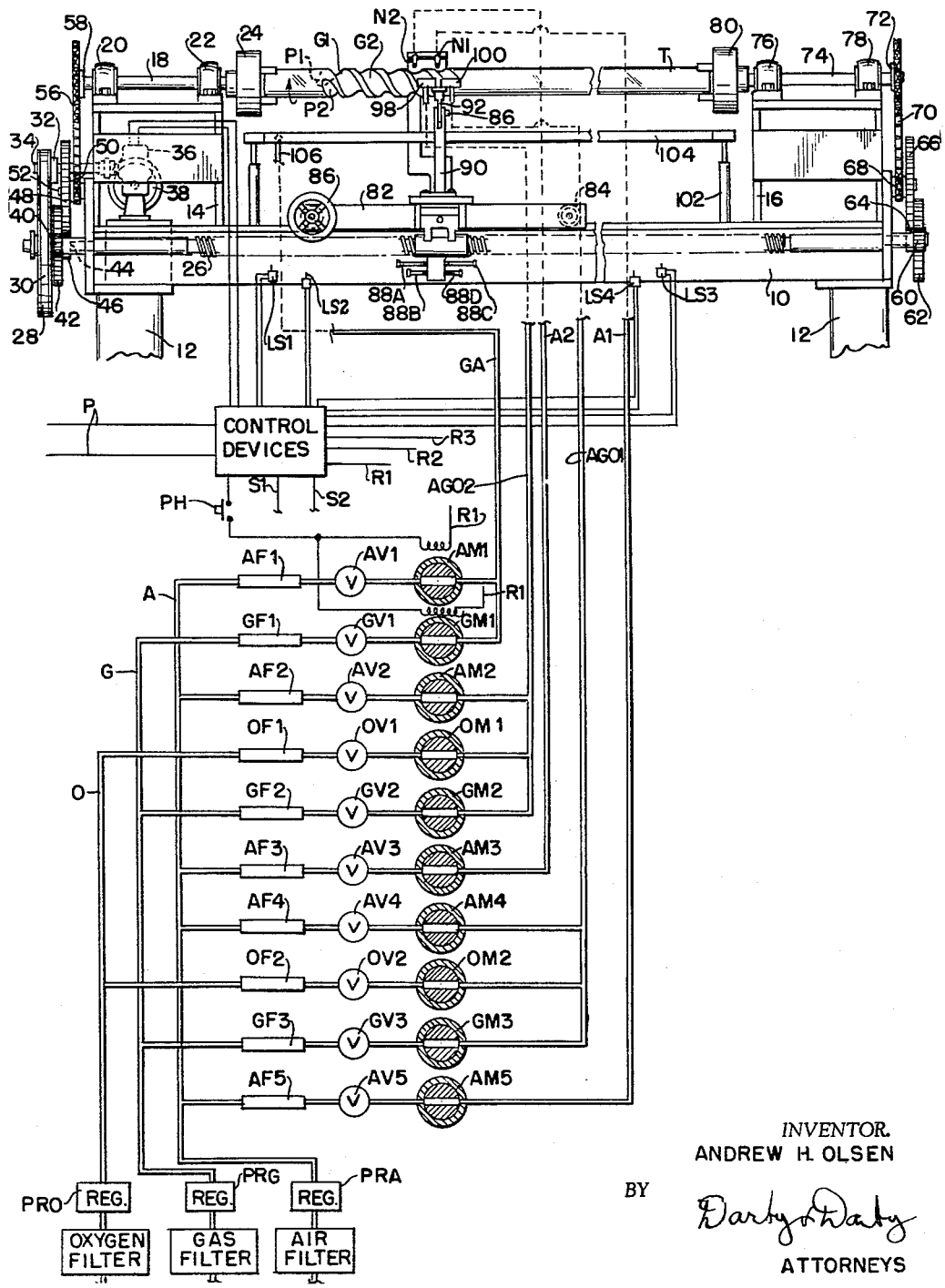

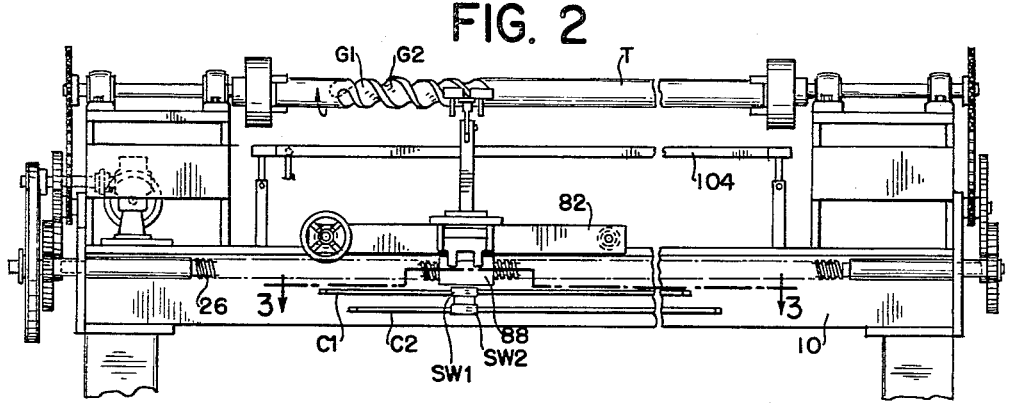
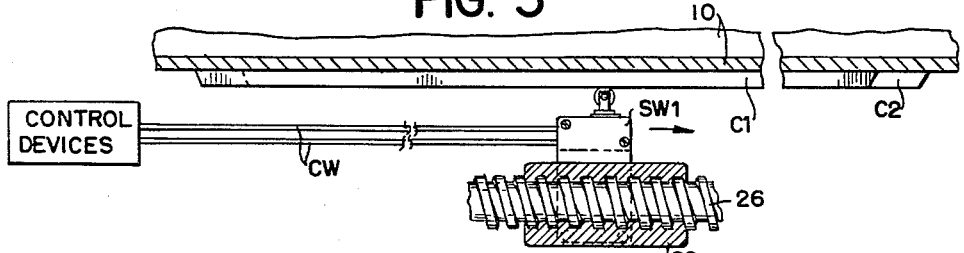
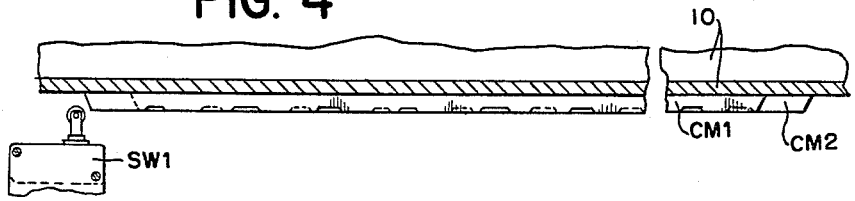
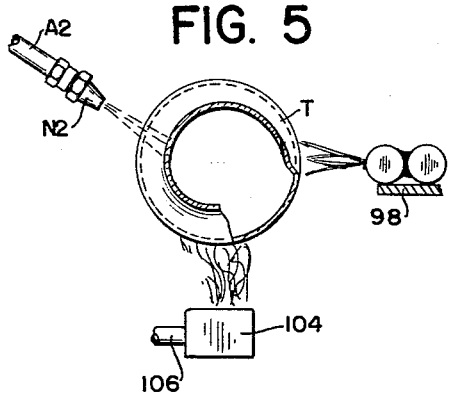
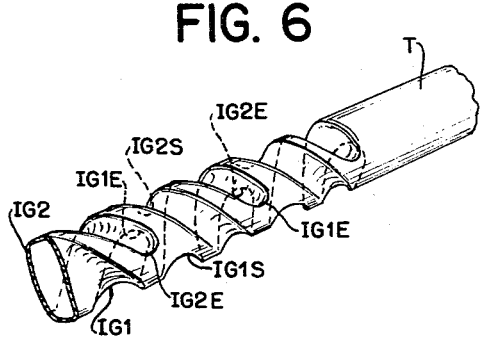
INVENTOR.
ANDREW H. OLSEN

United States Patent Office 3,169,657
Patented Feb. 16, 1965

3,169,657
MACHINE FOR FORMING LAMP TUBES AND ARTICLE FORMED THEREBY
Andrew H. Olsen, Jersey City, N.J., assignor to Duro-Test Corporation, North Bergen, N.J., a corporation of New York
Filed July 6, 1961, Ser. No. 122,328
15 Claims. (Cl. 220—2.1)

This invention is concerned with a machine for converting plain, thin-walled glass tubes, of a type for example, such as the enclosure for a fluorescent lamp, into helicoidal formation.

The general object of this invention is to provide a machine of this type with automatic controls so as to minimize supervision of its operation and speed up production.

The system comprising this invention employs a tube forming machine of the type disclosed, for example, in copending application Serial No. 85,790, filed January 30, 1961, for Method and Apparatus for Forming Spiral Lamp Tubes.

The specific object of the invention will be best understood by describing the construction and operation of the system comprising this invention in connection with the attached drawings.

In the accompanying drawings,

FIGURE 1 is a view showing the machine or lathe portion of the system in elevation and the various electrical and fluid pressure circuits diagrammatically;

FIGURE 2 is a view similar to FIG. 1, with regard to the glass lathe, showing a modified control for the torches;

FIGURE 3 is a cross-sectional view taken on the line 3—3 of FIG. 2;

FIGURE 4 is a detailed view similar to that of FIG. 3, showing a modified structure;

FIGURE 5 is a somewhat diagrammatic view illustrating the relative positions of the annealing burner, the torches and the cooling nozzle showing the tube in cross-section; and FIGURE 6 is a perspective view of a portion of a glass envelope having a pair of interrupted helical grooves.

This disclosure is concerned primarily with the electrical and fluid pressure circuits and the control thereof in association with the glass lathe of the above mentioned application, whereby that lathe can be automatically operated. In order to fully understand the objects and the operation of the system herein disclosed, the description of the glass lathe disclosed in the above mentioned application will be repeated here.

The machine includes a base 10 which is generally of I-beam formation laid on its side. This beam forms the bed of the machine which is supported by any suitable substructure such as the legs 12. Mounted on top of the beam at the lefthand end is a built-up standard 14 and a similar built-up standard 16 supported at the other end of the beam in alignment with the first standard. Journaled on top of the standard 14 in a pair of bearings 20 and 22 is a shaft 18 which has mounted on its righthand end any suitable form of chuck for gripping a glass tube. Journaled in suitable bearings on the front of the bed 10 is a lead screw 26 which extends throughout the length of the bed and projects beyond each end, as shown in FIG. 1.

Keyed to the lefthand end of the lead screw 26 is a pulley 28 which is connected by a belt 30 to a smaller drive pulley 32. Pulley 32 is keyed to a shaft 34 which is connected to a suitable drive motor 38 through a reduction gearing assembly 36.

Also keyed to the lead screw 26 is a drive pinion 40 which meshes with a driven gear 42 rotatably mounted on a stud shaft 44. Secured to the gear 42 is a pinion 46 which meshes with a gear 48 mounted on a stud shaft 52 supported by the standard 14. Connected with the gear 48 is a sprocket 50 connected by a chain 56 to a larger sprocket 58 secured to the shaft 18.

On the other end of the lead screw 26 is a drive pinion 60 meshing with a driven gear 62, corresponding to the gear 42, rotatably mounted on a stud shaft supported at the other end of the bed. Secured to the gear 62 for rotation with it is a pinion 64 which meshes with a gear 66, corresponding to the gear 48, also mounted on a suitable stud shaft, corresponding to the shaft 52. Connected to the gear 66 for rotation with it is a drive sprocket 68 connected by a chain 70 to a driven sprocket 72. Sprocket 72 is keyed to a shaft 74 rotatably mounted in bearings 76 and 78 supported on the standard 16. On the lefthand end of the shaft 74 is a chuck 80 corresponding to the chuck 24. Shafts 18 and 74 rotate on the same axis in alignment. As illustrated in FIG. 1 a glass tube to be provided with one or more grooves is mounted in the chucks 24 and 80 and gripped by them to cause rotation of the glass tube on its axis.

A carriage 82 is provided with front and back pairs of grooved rollers 84 positioned to ride on the edges of the I-beam bed 10. As shown in FIG. 1, a hand wheel 86 can be connected to one of these grooved rollers so that the carriage can be adjusted along the bed in an obvious manner.

Pivotally mounted on the carriage 82 is a half nut 88 arranged to be moved into and out of engagement with the lead screw 26 in a manner commonly used in lathe construction.

Extending upwardly from the carriage 82 is a standard 90 on the upper end of which is pivotally mounted a torch support 92. As shown in FIG. 1, the torch support 92 can be swung through a limited axis on the center of the shafts 18 and 74 and locked in various angular positions by means of a thumb nut 86. Mounted on the torch support 92 are a pair of torches 98 and 100 which are longitudinally spaced along the axis of the tube T.

A pair of vertically adjustable supports 102 are arranged in longitudinally spaced relation on top of the bedplate 10 and support an elongated fuel burner 104 which is positioned, as is clear from FIG. 1, to direct heat onto the glass tube T, substantially throughout its length.

With regard to the torches used for heating the glass tube to form one or two grooves they are for purposes of this disclosure of any suitable form, of which a number of commercially available torches are examples. The torch 98 in the case of FIG. 5, for example, is of the type which produces a more or less round flame in cross-section, which is adjusted to apply heat at a point or limited area of generally circular cross-section. At this point it could be noted that other kinds of torches can be used such as one which would produce a ribbon flame applying heat to the glass tube T at a point of limited area of generally rectangular cross-section.

The electric and pressure fluid circuits are diagrammatically illustrated and shown connected to the various operated parts so that one skilled in the art could readily reproduce the subject matter of this invention.

Mounted on the front of the lathe body 10 are two pairs of limit switches LS1, LS2, LS3 and LS4. Supported in any suitable manner on the nut 88 which engages the lead screw 26, are the fingers 88a, 88b, 88c and 88d which operate the limit switches respectively in a predetermined order, as will be explained in greater detail below.

As illustrated in FIG. 1, an air, gas and oxygen line AGO1 is connected to the torch 100 and similarly an air, gas and oxygen line AGO2 is connected to the torch 98. Line AGO1 is connected to the sources of air, oxygen and gas, as shown. The gas, of course, is the fuel for the burner and can be any combustible fuel suited to the purpose, such as for example natural gas. The air source, which can be a compressed air tank for example is connected through the main air filter and a pressure regulating valve PRA to the line AGO1, through a flow rate indicator AF4, a flow regulating valve AV4 and an electromechanically operated valve AM4, all arranged in series. The fuel gas from any suitable source passes through a gas filter, a pressure regulating valve PRG, a flow rate indicator GF3, a flow control valve GV3, and an electromagnetically operated valve GM3, to the line GO1. A source of oxygen such as bottled oxygen is also connected to the line AGO1, through an oxygen filter, the pressure regulating valve PRO, the flow rate indicator OF2, the regulating valve OV2, and the electromagnetically operated valve OM2.

In a similar way air, gas and oxygen are supplied to the line AGO2 from the same sources. In the case of air, it is supplied from the main supply line A to the line AGO2, through the flow rate indicator AF2, the control valve AV2, and electromagnetically operated valve AM2. Fuel gas is supplied from the main line G through the flow rate indicator GF2, the control valve GV2, and the electromagnetic valve GM2. Fuel oxygen is supplied from the main line O through the flow rate indicator OF1, the control valve OV1, and the electromagnet valve OM1.

Air and gas to provide a combustible mixture is supplied to the annealing burner 104 through the gas-air line GA. Air reaches this line from the supply line A through the flow rate indicator AF1, the control valve AV1, and the electromagnetic valve AM1. Gas is supplied from the main line G, through the flow rate indicator GF1, the control valve GV1, and the electromagnetic valve GM1.

The flow rate indicators may be any one of a number of commercially available devices of this type suited to the purpose, as is true of the electromagnetic valves which are normally closed when their windings are de-energized, and are open when they are energized. The control valves are also ordinary valves of commerce suited to the purpose of controlling the rate of flow of gas through the line to which they are connected, and for purposes of this invention may be adjustable needle valves. The pressure regulator valves PRO, PRG and PRA are likewise not special in themselves, but are available commercially. They are the type which can be adjusted to maintain any desired pressure in the main feed lines O, G and A, suited to the purpose.

The control center indicated by the legend "Control Devices," includes various commercially available components for performing the functions which will be described. Power for the operation of the circuits is supplied through the circuit wires P. The operating windings for the valves AM1 and GM1 are shown diagrammatically and are supplied with current in parallel through a circuit from the control center which includes in the case illustrated the manual normally open single-pole double-throw switch PH. The return wires R1 for the windings which may be a common circuit go back to the control center as shown.

In a similar way current for the windings of the electromagnetically operated valves AM2, OM1, GM2 and AM3, is supplied from the common lead S1 extending from the control center and the common return lines for the windings go back to the control center through the circuit R1, R2. It is here noted that all of the windings and circuit wires for the parts are not shown in order to keep the diagrammatic illustration simplified. Circuitry for these windings is obvious having in mind that windings for this set of valves are simply in parallel. The same is true with regard to the windings for the electromagnetically operated valves AM4, OM2, GM3 and AM5, which are supplied by the common circuit wire S2. Their common return circuit wire is shown at R3.

As shown in FIGS. 1 and 5, a pair of nozzles N1 and N2 are supported on the carriage for movement with it. These nozzles are on the opposite side of the axis of rotation of the tube T, and can be adjusted for different pitches of grooves so as to direct streams of cooling gas such as air into the grooves being formed. As shown in FIG. 5, the nozzle N2 is circumferentially displaced with respect to the associated torch 98 so that when the groove has sagged or formed a predetermined amount the glass will be chilled or set to prevent further sagging. These nozzles N1 and N2 are supplied with air from the air supply line A, through the pipes A1 and A2 respectively. Each of the lines A1 and A2 has connected in series in it the flow rate indicator AF5, the regulating valve AV5 and the electromagnetic valve AM5, and the flow rate indicator AF3, the control valve AV3 and electromagnetic valve AM3, respectively.

The operation of this system is as follows: A plain thin-walled glass tube T, such for example as used as an enclosure for a fluorescent lamp, is mounted in the chucks 24 and 80, the carriage 82 having been operated in any suitable manner, as for example by means of the handwheel 86 to a lefthand limit position, FIG. 1. In being moved to this position the operating fingers 88a and 88b pass by the limit switches LS1 and LS2 without closing them. Switches of this type are available in various forms, and so are only shown diagrammatically.

To initiate the operation of the machine the operator first closes the switch PH, energizing the windings for the magnetic valves AM1 and GM1 to cause these valves to open. The closing of the switch PH could have been effected automatically upon the arrival of the carriage 82 to its lefthand position, if desired. The operation of the valves AM1 and GM1 causes air and gas in proper mixture, depending upon the adjustment of the control valves AV1 and GV1, to be supplied through the line GA to the connection 106 on the annealing burner 104. In addition drive motor 38 is energized and the tube T begins to rotate.

This annealing burner is supported under the glass tube T, extending parallel to its longitudinal axis so that the flame lies under the tube. It is apparent, of course, that some form of ignition for the gas, not shown, will be supplied. The flame which is in the form of a ribbon, heats the glass tube T to a desired preheated temperature depending upon the characteristics of the glass. In the case of a fluorescent tube enclosure, this will be of the order of 470° C. plus or minus 25°.

After the tube has been preheated for a sufficient period of time the circuit from the control center to the motor 38 is completed which starts the lathe in operation, causing the tube T to rotate on its longitudinal axis at a predetermined speed. At the same time the lead screw 26 is driven through the power transmission chain described above at the proper rate of speed. Rotation of the lead screw by reason of its engagement with the nut 88 will start the carriage 82 moving to the right from its lefthand starting position. As a result, with the torches 98 and 100 in alignment, it is apparent that the torch 100 will be the first to reach the point P1, where the torch 100 is to go into action. At this point the finger 88a will actuate the limit switch LS1 which will complete a circuit through the control center to the supply connection S1, whereupon all of the windings, not shown, for the magnet valves AM4, OM2, GM3 and AM5, will be energized. These valves will open and will simultaneously supply air, gas and oxygen in the proper proportions to the supply line AGO1, connected to the torch 100, as shown.

The combustible mixture supplied to the torch upon ignition will direct a flame onto the surface of the glass tube T, starting at the point P1. The tube will be heated up to the temperature which will soften the thin glass wall at the point of impact and the tube T rotating in the direction of the arrow (in a counterclockwise direction when viewed from the lefthand end) will sag inwardly under the action of gravity in a spiral path to form the groove G1. It is apparent, of course, that the pitch of the lead screw 26 will be such with relation to the speed of rotation of the tube T, to form a spiral groove of a predetermined pitch. As the softened glass sags into curvilinear form in cross-section it will move into the path of air flowing from the nozzles N1 and N2. These nozzles are positioned so as to limit the depth of formation of the grooves as conditions require. The relative position of the application of heat by the torch and the application of cooling air at the nozzle is indicated in FIG. 5. These relative positions can be changed to produce curves of various depths. It will be noted that at the time the torch 100 was turned on cooling air was supplied through the line A1 to the nozzle N1, because the electromagnetic valve AM5 was actuated.

The tube T in FIG. 1 is shown with two grooves, namely the grooves G1 and G2. They are illustrated as being 180° apart, that is their starting points P1 and P2 are circumferentially displaced 180°. The groove G2 is formed by the torch 98 and its actuation is controlled by the limit switch LS2. In other words, when the carriage 82 has moved a distance corresponding to half a revolution of the tube T the finger 88b will actuate the limit switch LS2. The closing of this limit switch will energize the circuit wire S2 to energize the windings for the magnet valves AM2, OM1, GM2 and AM3. Thus again a properly proportioned mixture of air, gas and oxygen will be supplied through the actuated magnet valves and the line AGO2 to the torch 98. This mixture is ignited to direct a flame starting at the point P2 onto the wall of the tube T. Thus the second groove, that is the groove G2 begins to form. At the same time cooling air is supplied to the nozzle N2 through the line A2 from the actuated valve AM3.

This operation continues until the control finger 88c on the carriage actuates the limit switch LS3. This limit switch will de-energize the supply line S1 to the windings of the magnet valves which control the supply of air, gas and oxygen to the line AGO1. The result is that the fuel mixture to the torch 100 will be shut off and the formation of groove G1 will be interrupted. Shortly thereafter the finger 88d on the carriage will actuate the limit switch LS4 to likewise interrupt the circuit S1 so that the magnetic valve supplying the air, gas and oxygen through the line AGO2 will close and the formation of the groove G2 will be interrupted at a point displaced 180° circumferentially with respect to the groove G1.

Those skilled in the electrical arts will readily understand how these circuits can be controlled by simple variable components. For example, making the circuits controlled by the limit switches LS1 and LS2 can be completed through relays which set up their own holding circuits. The breaking circuits which include the limit switches LS3 and LS4 can be in the holding circuit lines so as to de-energize these relays at the end of the groove forming operation.

It is hardly necessary to note that the various control valves AV1, GV1, AV2, OV1, GV2, AV3, AV4, OV2, GV3 and AV5 will be adjusted to control the proper supply of air, gas and oxygen to the various lines so that the required mixtures to produce the proper temperatures can be predetermined.

As suggested above, the annealing flame and the flames of the groove forming torches, can be automatically ignited at the beginning of each related operation in various ways, including the use of pilot lights, electric ignition, and the like. In the case of pilot lights they would stay on all the time, the control valves being bypassed to maintain small pilot lights in an obvious manner. As an alternative the ignition spark could be actuated automatically upon actuation of the limit switches.

There is illustrated in FIGS. 2 and 3 an alternative arrangement for controlling the torches 98 and 100. In this case instead of providing fixed limit switches there could be used cams, mounted in any suitable place on the machine body, as for example on the front, as shown in these two figures. With this arrangement suitably shaped cams C1 and C2 are mounted on the front of the bed 10 of the machine in a position to actuate at the proper time, switches S1 and S2 mounted on the nut 88. These switches are respectively aligned with the cam C1 and C2 so that when they move into contact with the cams as the carriage moves from left to right, they will be actuated to effect the same controls as previously described, with respect to the limit switches LS1 to LS4 inclusive.

In order to get the required circumferential displacement of the torch action the cams C1 and C2 are staggered, as shown, so that switch S1 is actuated to start groove G1 and switch S2 is later, that is 180° later, actuated to start the groove G2. The cams C1 and C2 terminate at positions to determine the ends of the grooves so that as the switches disengage the cams the torches are shut off.

A further modification is illustrated in FIGS. 4 and 6. The apparatus is similar to that of FIG. 2, but in this case the cams CM1 and CM2 have interrupted camming surfaces so as to turn the torches off when the switches S1 and S2 engage the depressions of the respective cams. It is obvious that with this arrangement a double groove tube can be formed having interrupted helicoidal sections. As the actuators of the switches mounted on the nut are interrupted at the depressions in the cam the torches will be extinguished, discontinuing forming the grooves, with the result that the final tube will have interrupted grooves, as indicated for a section of the tube in FIG. 6. In FIG. 4 the depressions in each cam will be uniformly spaced, but they could be varied with respect to each other in each cam and with respect to the related grooves in the other cam so that various lengths of groove interruptions are produced.

The mechanism of FIG. 4 can be used to produce a tube having one or more helical grooves in the wall comprising disconnected sections such as would result from the coaction of the cams CM1 and CM2 with the associated control switches for the torches. In the example illustrated the two helical grooves are shown displaced 180° circumferentially, although as mentioned before this is not necessarily required because other circumferential spacings could be used. Likewise, as will be apparent, within limits more than two grooves as well as one, can be formed comprising disconnected sections.

In the case illustrated in FIG. 6, the pair of grooves have been designated as IG1 and IG2. These grooves are sectionalized so that in the case of IG1 that section ends at IG1E and starts again at IG1S and ending again at IG1E. In the case of the groove IG2, the first section shown ends at IG2E, begins again at IG2S and ends at IG2E. The result is that each of the grooves IG1 and IG2 lies along the same helical paths but are interrupted every so often to form sections. It is apparent that these sections can as shown be of equal length or of different lengths either in the same helical paths or in different helical paths with respect to each other.

It is likewise apparent that the sections can be staggered longitudinally of the tube, all of which conditions are determined by the interruptions by the longitudinal positions of the depressions in the surfaces of the cams CM1 and CM2. The sections of the two grooves could be so relatively spaced longitudinally that a cross-section of the tube T thereat would be circular or the sections of one groove could overlap the ending and beginning of the opposed section of the other groove so that at that point the tube would be deformed by one groove only.

These configurations can be further complicated by the fact that if the grooves are not displaced 180° in a circumferential direction other geometrical formations will result.

From the above description it will be apparent that there is disclosed herein a machine which is substantially fully automatic and which could easily be made completely automatic for producing helically grooved glass tubes of a type such as could be used for the envelope of fluorescent lamps, but are not necessarily limited to such use.

As those skilled in the art to which this invention applies will readily appreciate, many changes in the details of construction and association of elements will be readily apparent to produce modifications of the parts disclosed, and it is preferred, therefore, that this disclosure be taken in an exemplary sense. It is intended that the invention be defined by the appended claims.

What is claimed is:

1. In combination with, means for supporting a glass tube for rotation on its longitudinal axis in a horizontal plane, at least two torches spaced axially of said tube and carriage means for supporting said torches and advancing them along a path parallel to the axis of said tube in timed relation to the speed of rotation of said tube, of combustible fuel mixture supply means for said torches, and means actuated by said carriage to successively activate and deactivate said supply means to render said torches successively operative and inoperative whereby two circumferentially displaced grooves are formed by the sagging of the wall of said tube along helical paths.

2. In the combination of claim 1, power means for simultaneously effecting rotation of said tube and movement of said carriage, and means for initiating the energization of said power means.

3. In the combination of claim 1, said combustible fuel mixture supply means including means for maintaining a predetermined fuel mixture pressure.

4. In the combination of claim 1, said combustible fuel mixture supply means including means for maintaining a predetermined fuel mixture pressure and rate of feed of the fuel mixture.

5. In the combination of claim 1, an annealing burner supported parallel to said axis of rotation of the tube below it, and means for supplying a combustible gas to said burner prior to the activation of said torches.

6. In the combination of claim 1, means mounted on said carriage for directing a cooling gas into said grooves.

7. In combination with means for supporting a glass tube for rotation on its longitudinal axis in a horizontal plane, at least two torches spaced axially of said tube, carriage means for supporting said torches and advancing them along a path parallel to the axis of said tube in timed relation to the speed of rotation of said tube, and power means for effecting rotation of said tube supporting means and advancing movement of said carriage means, of means for supplying a gaseous fuel mixture to said torches, an annealing burner supported under said axis, means for supplying a combustible fuel to said burner, and means for simultaneously energizing said power and actuating said burner fuel supply means.

8. In the combination of claim 7, fuel supply means for said torches and means actuated by said carriage for successively operating said fuel supply means for said torches.

9. In the combination of claim 7, fuel supply means for said torches and means actuated by said carriage for successively operating said fuel supply means for said torches, and means actuated by said carriage for successively controlling said fluid supply means for said torches to interrupt the fuel supply thereof.

10. In the combination of claim 7, cooling nozzles supported on said carriage and positioned to direct cooling air into the grooves being formed by said torches.

11. An enclosure comprising a single thin walled glass tube having at least one helical groove formed in its wall comprising a plurality of disconnected sections lying on and longitudinally spaced along the same helix.

12. An enclosure comprising a single thin walled glass tube having two helical grooves formed in its wall, each of said grooves being circumferentially spaced and comprising disconnected sections respectively lying on and longitudinally spaced along the same helix.

13. In the article of claim 12, said grooves being circumferentially spaced approximately 180 degrees.

14. In the article of claim 12, said groove sections being of equal length.

15. In the article of claim 12, said groove sections being of unequal length.

References Cited by the Examiner
UNITED STATES PATENTS

| | | | |
|---|---|---|---|
| 1,926,552 | 9/33 | Morgan | 65—4 X |
| 2,282,993 | 5/42 | Dichter | 65—271 |

DONALL H. SYLVESTER, *Primary Examiner.*